US011743242B2

(12) United States Patent
Manser et al.

(10) Patent No.: US 11,743,242 B2
(45) Date of Patent: Aug. 29, 2023

(54) ESTABLISHING AN ENCRYPTED COMMUNICATIONS CHANNEL WITHOUT PRIOR KNOWLEDGE OF THE ENCRYPTION KEY

(71) Applicant: Charter Communications Operating, LLC, St. Louis, MO (US)

(72) Inventors: Charles J. Manser, Clearwater, FL (US); Jeffrey Rowell, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 442 days.

(21) Appl. No.: 16/939,178

(22) Filed: Jul. 27, 2020

(65) Prior Publication Data

US 2022/0029974 A1    Jan. 27, 2022

(51) Int. Cl.
*H04L 29/06* (2006.01)
*H04L 9/40* (2022.01)
*H04L 9/08* (2006.01)

(52) U.S. Cl.
CPC .......... *H04L 63/0485* (2013.01); *H04L 9/085* (2013.01); *H04L 9/0819* (2013.01)

(58) Field of Classification Search
None
See application file for complete search history.

(56) References Cited

U.S. PATENT DOCUMENTS

| | | | | |
|---|---|---|---|---|
| 2005/0027985 A1* | 2/2005 | Sprunk | ................... | H04L 63/12 379/900 |
| 2007/0199049 A1* | 8/2007 | Ziebell | ................... | H04L 63/10 726/3 |
| 2009/0323954 A1* | 12/2009 | Sprunk | ................. | H04L 63/062 380/45 |
| 2013/0298182 A1* | 11/2013 | May | ....................... | H04L 63/10 726/1 |
| 2020/0154272 A1* | 5/2020 | Uy | ....................... | H04W 12/04 |

(Continued)

OTHER PUBLICATIONS

Imamoto, Kenji et al., "Design and Analysis of Diffie-Hellman-Based Key Exchange Using One-time ID by SVO Logic," Electronic Notes in Theoretical Computer Science 135 (2005) 79-94, 1571-0661, Published by Elsevier B.V., https://www.sciencedirect.com/science/article/pii/S157106610505053X, Jul. 5, 2005, 16 pages.

(Continued)

*Primary Examiner* — Jeffery L Williams
(74) *Attorney, Agent, or Firm* — Dority & Manning, P.A.

(57) ABSTRACT

Establishing an encrypted communications channel without prior knowledge of an encryption key is disclosed. A gateway router device receives, from a server device via an intermediate modem device, a first secret key code for use in establishing an encrypted communications channel between the gateway router device and the modem device. The gateway router device makes an attempt to establish the encrypted communications channel with the modem device using a pre-shared key that is based on the first secret key code. The gateway router device determines that the attempt to establish the encrypted communications channel has either succeeded or failed. The gateway router device, in response to determining that the attempt to establish the encrypted communications channel has either succeeded or failed, performs a success action or performs a failure action.

19 Claims, 9 Drawing Sheets

(56) References Cited

U.S. PATENT DOCUMENTS

2021/0218717 A1\* 7/2021 Hill ................... H04L 9/0822
2022/0029974 A1\* 1/2022 Manser ............... H04L 9/088
2022/0322087 A1\* 10/2022 Uy .................... H04W 12/06

OTHER PUBLICATIONS

Author Unknown, "Technical Brief MACsec," https://gonorthforge.com/wp-content/uploads/2017/10/NII_MKT-Layer2-Security-MACsec-Tech-Brief_V.2.2.pdf, 2017, 5 pages.

\* cited by examiner

ESTABLISHING AN ENCRYPTED COMMUNICATIONS CHANNEL WITHOUT PRIOR KNOWLEDGE OF THE ENCRYPTION KEY

BACKGROUND

An establishment, such as a business organization, a public institution, a household, or the like, often implements a local area network (LAN) so that computing devices associated with the establishment can communicate with one another. A LAN may also include a gateway router device that facilitates communications between the computing devices on the LAN and other computing devices that are outside of the local area network, such as a server computing device on the Internet.

The establishment may subscribe to communication services from a third party, sometimes referred to as a service provider. A service provider often installs a modem device, such as a cable modem device or a fiber modem device, in, or in proximity to, the establishment. The modem device is communicatively connected to the gateway router device. The modem device is connected to the service provider's network, and operates in conjunction with the gateway router device to enable communications between computing devices on the local area network and computing devices on networks other than the LAN.

SUMMARY

The embodiments disclosed herein, among other features, establish an encrypted communications channel without prior knowledge of the encryption key, and eliminate a need for a skilled technician, or any other individual, to manually configure an encrypted communications channel.

In one embodiment a method is provided. The method includes receiving, by a gateway router device from a server device via an intermediate modem device, a first secret key code for use in establishing an encrypted communications channel between the gateway router device and the modem device. The method further includes making, by the gateway router device, an attempt to establish the encrypted communications channel with the modem device using a pre-shared key that is based on the first secret key code. The method further includes determining that the attempt to establish the encrypted communications channel has either succeeded or failed. The method further includes, in response to determining that the attempt to establish the encrypted communications channel has either succeeded or failed, performing a success action or performing a failure action.

In another embodiment a gateway router device is provided. The gateway router device includes a memory and a processor device coupled to the memory. The processor device is configured to receive, from a server device via an intermediate modem device, a first secret key code for use in establishing an encrypted communications channel between the gateway router device and the modem device. The processor device is further configured to make an attempt to establish the encrypted communications channel with the modem device using a pre-shared key that is based on the first secret key code. The processor device is further configured to determine that the attempt to establish the encrypted communications channel has either succeeded or failed. The processor device is further configured to, in response to determining that the attempt to establish the encrypted communications channel has either succeeded or failed, perform a success action or perform a failure action.

In another embodiment a non-transitory computer-readable storage medium is provided. The non-transitory computer-readable storage medium includes instructions configured to cause a processor device to receive, from a server device via an intermediate modem device, a first secret key code for use in establishing an encrypted communications channel between the gateway router device and the modem device. The instructions are further configured to cause the processor device to make an attempt to establish the encrypted communications channel with the modem device using a pre-shared key that is based on the first secret key code. The instructions are further configured to cause the processor device to determine that the attempt to establish the encrypted communications channel has either succeeded or failed. The instructions are further configured to cause the processor device to, in response to determining that the attempt to establish the encrypted communications channel has either succeeded or failed, perform a success action or perform a failure action.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first secret key code" and "second secret key code," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

An establishment, such as a business organization, a public institution, a household, or the like, often implements a local area network (LAN) so that computing devices associated with the establishment can communicate with one another. A LAN may also include a gateway router device that facilitates communications between the computing devices on the LAN and other computing devices that are outside of the LAN, such as a server computing device on the Internet.

The establishment may subscribe to communication services from a third party, sometimes referred to as a service provider. A service provider often installs a modem device, such as a cable modem device or a fiber modem device, in, or in proximity to, the establishment. The modem device is communicatively connected to the gateway router device. The modem device is connected to the service provider's network, and operates in conjunction with the gateway router device to enable communications between computing devices on the LAN and computing devices on networks other than the LAN.

An establishment often has a desire, or even a requirement, to ensure that electronic communications are encrypted. The computing devices on the LAN may encrypt communications, such as by using a layer 2 encryption mechanism, such as MACsec. If the gateway router device receives an encrypted communication from a computing device on the LAN that is destined for another network, the gateway router device decrypts the packet, and sends the decrypted packet to the modem device, because the modem device will not have the appropriate decryption key to decrypt the packet. Similarly, a service provider may encrypt all communications on its network. When the modem device receives an encrypted packet from another computing device in the service provider's network that is destined for the LAN of the establishment, the modem device may first decrypt the packet, and send the decrypted packet to the gateway router device, because the gateway router device will not have the appropriate decryption key to decrypt the packet.

Thus, in this situation, the only communication link that is carrying unencrypted data is the communications link between the modem device and the gateway router device. This creates a vulnerability whereby an individual with access to the communications link may be able to obtain access to the unencrypted packets.

An individual with a capability of modifying both the modem device and the gateway router device, such as an employee of the service provider, may be able to configure the modem device and the gateway router device to establish an encrypted communications channel between the modem device and the gateway router device by installing suitable encryption keys in the modem device and the gateway router device. However, this is a technical process that requires a certain level of technical expertise, and thus requires a skilled technician who may even have to travel to the establishment and connect to both the modem device and the gateway router device to implement the encrypted communications channel. This is both time-consuming and costly.

The embodiments disclosed herein establish an encrypted communications channel without prior knowledge of the encryption key, and eliminate a need for a skilled technician, or any other individual, to manually configure an encrypted communications channel.

Figure 1:
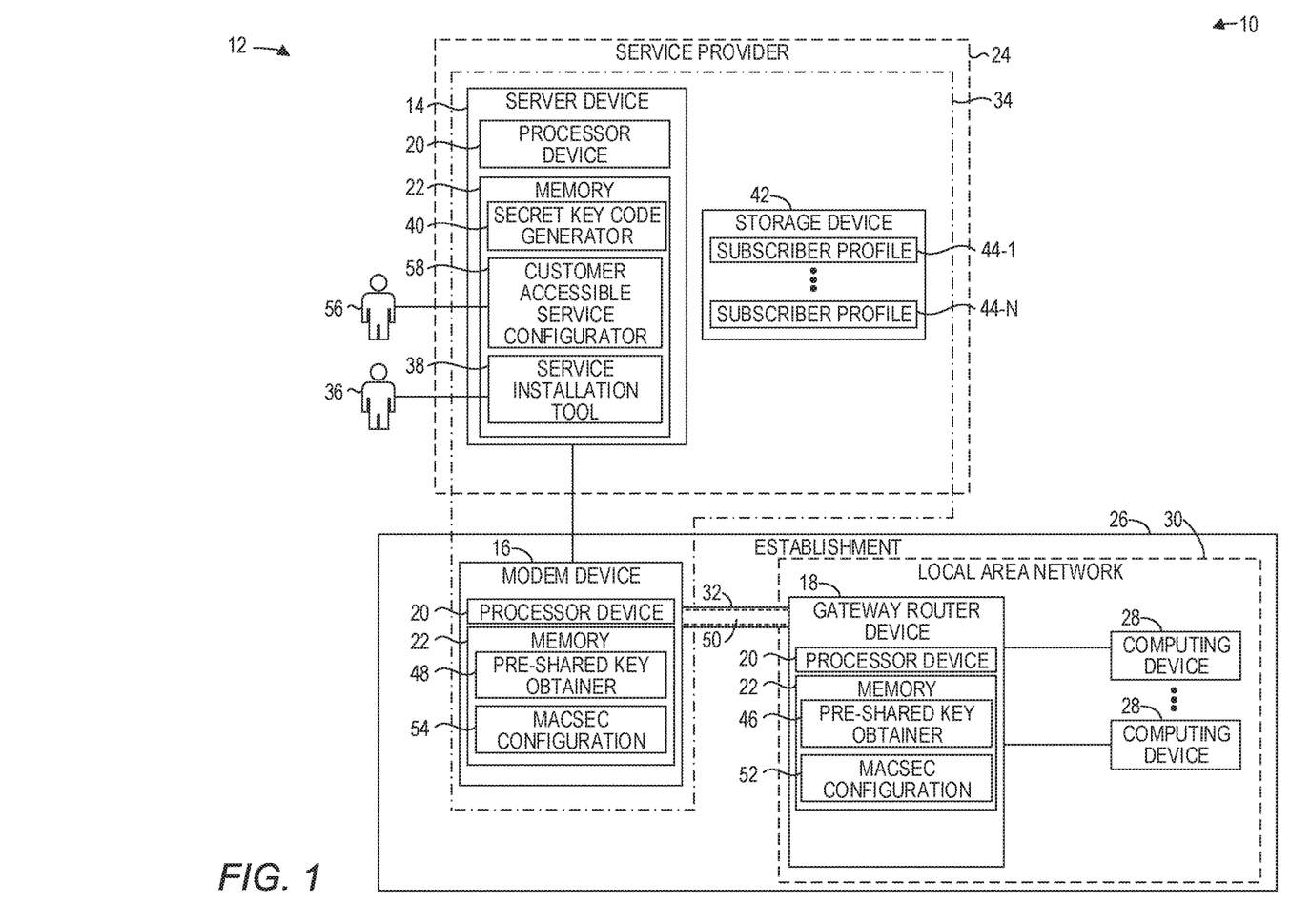
FIG. 1 is a block diagram of an environment in which embodiments for establishing an encrypted communications channel without prior knowledge of the encryption key may be practiced.

FIG. 1 is a block diagram of an environment 10 in which embodiments for establishing an encrypted communications channel without prior knowledge of the encryption key may be practiced. The environment 10 includes a system 12 that includes a server device 14, a modem device 16 and a gateway router device 18. The server device 14, modem device 16, and gateway router device 18 each include a processor device 20 and a memory 22. The server device 14 and the modem device 16 are provided by a service provider 24. The service provider 24 provides communications services to a plurality of establishments 26. While only one establishment 26 is illustrated, the service provider 24 may provide services to thousands or millions of establishments 26.

The establishment 26 operates the gateway router device 18, which is communicatively coupled to a plurality of computing devices 28. The gateway router device 18 and the computing devices 28 are on the same local area network (LAN) 30. The term "same network" (or same LAN) refers to a subnetwork, or subnet, wherein each connected computing device 28 on the subnet has an internet protocol (IP) address that has the same network address, and which utilizes the same subnet mask to determine whether other computing devices are on the same network or are on a different network. Such computing devices may be referred to herein as being "on" the same subnet, or "on" the same network. Computing devices on the same subnet can communicate with one another, typically via layer 2 addressing, such as via a media access control (MAC) address, without the need for a router.

The gateway router device 18 has two ports, or connections, that are on two different networks. One network is the LAN 30, and the other network is a different subnet used to communicate with the modem device 16 via a communications link 32. Thus, the modem device 16 may not be on the LAN 30. In practice, the communications link 32 between the gateway router device 18 and the modem device 16 is often a single communications medium, such as an Ethernet cable, an optical fiber cable, or a wireless medium, that directly communicatively couples the gateway router device 18 and the modem device 16 with no intermediate devices between the gateway router device 18 and the modem device 16. The gateway router device 18 enables communications between the computing devices 28 and computing devices not on the LAN 30. In particular, the gateway router device 18 receives communications from the computing devices 28 that are destined for computing devices that are not on the LAN 30, and forwards such communications to the modem device 16 for subsequent forwarding toward the destination computing device. The gateway router device 18 also receives communications, via the modem device 16, from computing devices not on the LAN 30 that are destined for one of the computing devices 28, and delivers such communications to the appropriate computing device 28.

The server device 14 and the modem device 16 are on one or more networks 34 of the service provider 24. While solely for purposes of illustration the server device 14 is illustrated as communicating directly with the modem device 16, in practice, there may be any number of intermediate devices between the server device 14 and the modem device 16, such as distribution routers, aggregation devices, and the like. The communications between the server device 14 and the modem device 16 may be encrypted, and the communications on the LAN 30 may also be encrypted.

An example of establishing an encrypted communications channel over the communications link 32 without prior knowledge of an encryption key by either of the modem device 16 or the gateway router device 18 will now be discussed. Assume that a technician 36 accesses a service installation tool 38 and requests that an encrypted communications channel be established between the modem device 16 and the gateway router device 18 over the communications link 32. The request may include, by way of non-limiting example, information that directly or indirectly identifies the modem device 16, the gateway router device 18, and the subscriber that corresponds to the establishment 26.

In one implementation, a secret key code generator 40 receives the request. The secret key code generator 40 generates a secret key code. The secret key code may be generated in any desired manner, such as randomly, or based on some predetermined data. For example, the secret key code generator 40 may access a storage device 42 which stores a plurality of subscriber profiles 44-1-44-N (generally subscriber profiles 44), each of which corresponds to a different subscriber of the service provider 24. The secret key code generator 40 accesses the subscriber profile 44 of the subscriber that corresponds to the establishment 26 and generates a secret key code based on subscriber information, such as an account number of the subscriber, a street address of the subscriber, a zip code of the subscriber or the like. In some embodiments, the secret key code generator 40 may utilize some algorithm that processes one or more items of subscriber information and performs mathematical and or string operations on the subscriber information to generate the secret key code.

The secret key code generator 40 sends the secret key code to the modem device 16, and to the gateway router device 18 via the modem device 16. A pre-shared key obtainer 46 of the gateway router device 18 receives the secret key code, and a pre-shared key obtainer 48 of the modem device 16 receives the secret key code. The pre-shared key obtainer 46 may utilize the secret key code as a pre-shared encryption key. In some implementations, the pre-shared key obtainer 46 may perform one or more predetermined mathematical and or string manipulations on the secret key code to generate a pre-shared encryption key that is based on the secret key code. The pre-shared key obtainer 48 performs the identical process performed by the pre-shared key obtainer 46 so that the pre-shared key used by the modem device 16 is the same as the pre-shared key used by the gateway router device 18.

The gateway router device 18 attempts to establish an encrypted communications channel 50 using the pre-shared key. The gateway router device 18 may attempt to establish any type of encrypted communications channel that utilizes a pre-shared encryption key, such as, by way of non-limiting example, a MACsec encrypted communications channel, an IPsec encrypted communications channel, or the like. The exact sequence of steps for establishing the encrypted communications channel 50 differs depending on the type of encryption communications channel being established. In one implementation, the gateway router device 18 attempts to establish a MACsec encrypted communications channel, and generates a MACsec configuration 52 utilizing the pre-shared key. Similarly, the modem device 16 generates a MACsec configuration 54 utilizing the pre-shared key. The gateway router device 18 then determines whether the attempt to establish the encrypted communications channel 50 with the modem device 16 succeeded or failed. The gateway router device 18 then performs a success action or a failure action based on the determination. Various examples of success and failure actions will be discussed below.

Similarly, the modem device 16 also determines whether the attempt to establish the encrypted communications channel 50 with the gateway router device 18 succeeded or failed. The modem device 16 then performs a success action or a failure action based on the determination.

In another embodiment, the encryption process described above may be initiated by a user 56, such as an employee or resident associated with the establishment 26. The user 56 may access, for example, a customer accessible service generator 58, via a web browser or the like, and request that an encrypted communications channel be established between the modem device 16 and the gateway router device 18 over the communications link 32. Again, the request may include, by way of non-limiting example, information that directly or indirectly identifies the modem device 16, the gateway router device 18, and the subscriber that corresponds to the establishment 26. The secret key code generator 40 receives the request, and initiates the process described above.

Figure 2:
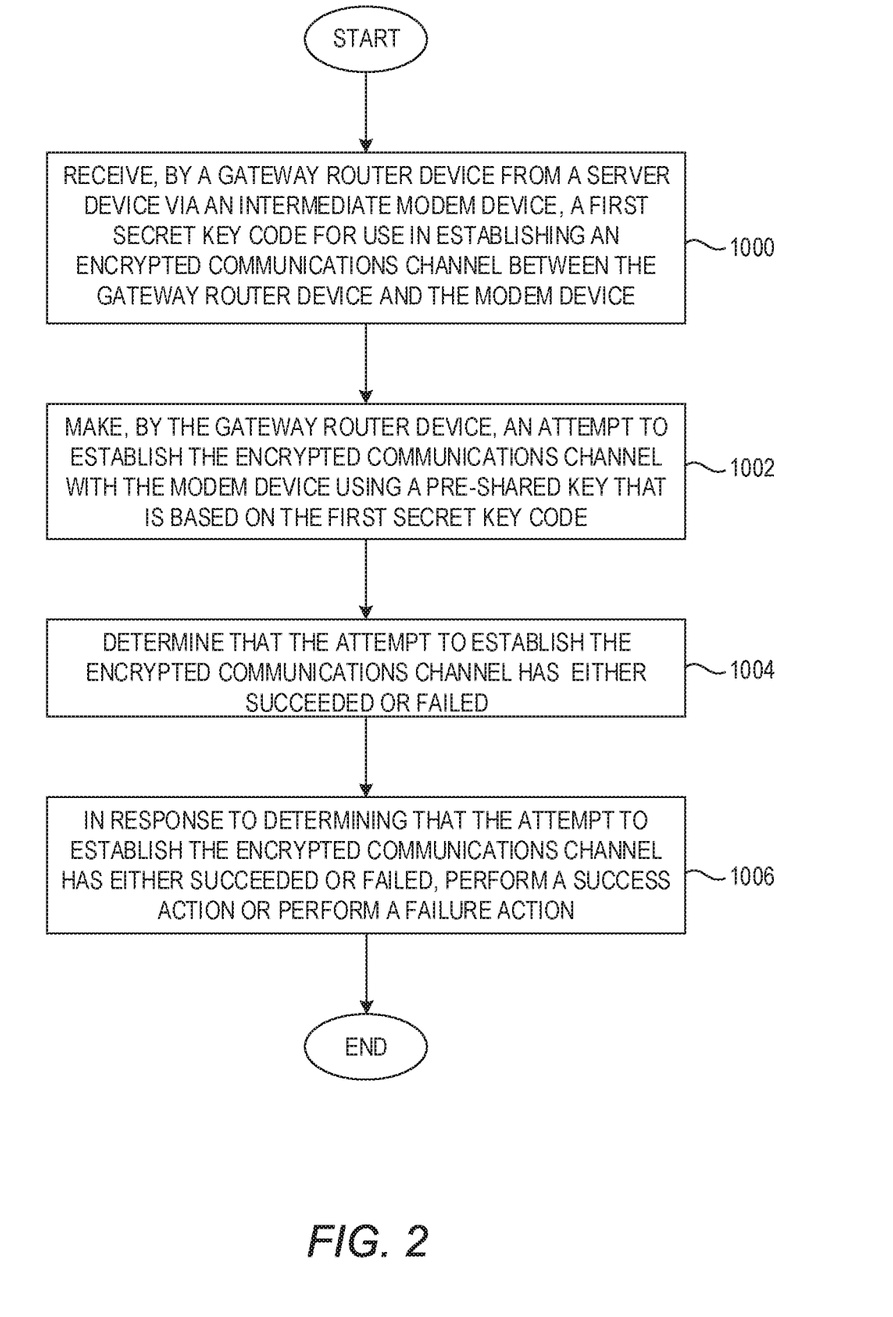
FIG. 2 is a flowchart for establishing an encrypted communications channel without prior knowledge of the encryption key, according to one embodiment.

FIG. 2 is a flowchart for establishing an encrypted communications channel without prior knowledge of the encryption key, according to one embodiment. FIG. 2 will be discussed in conjunction with FIG. 1. The gateway router device 18 receives, from the server device 14 via the intermediate modem device 16, a secret key code for use in establishing an encrypted communications channel between the gateway router device 18 and the modem device 16 (FIG. 2, block 1000). The gateway router device 18 makes an attempt to establish the encrypted communications channel 50 with the modem device 16 using a pre-shared key that is based on the secret key code (FIG. 2, block 1002). As discussed above, the pre-shared key may be based on the secret key code exactly, and may be the secret key code, or may be based on the secret key code indirectly, and be derived in part using the secret key code. The gateway router device 18 determines that the attempt to establish the encrypted communications channel 50 has either succeeded or failed (FIG. 2, block 1004). The gateway router device 18, in response to determining that the attempt to establish encrypted communications channel 50 has either succeeded or failed, performs a success action or performs a failure action (FIG. 2, block 1006).

Figure 3:
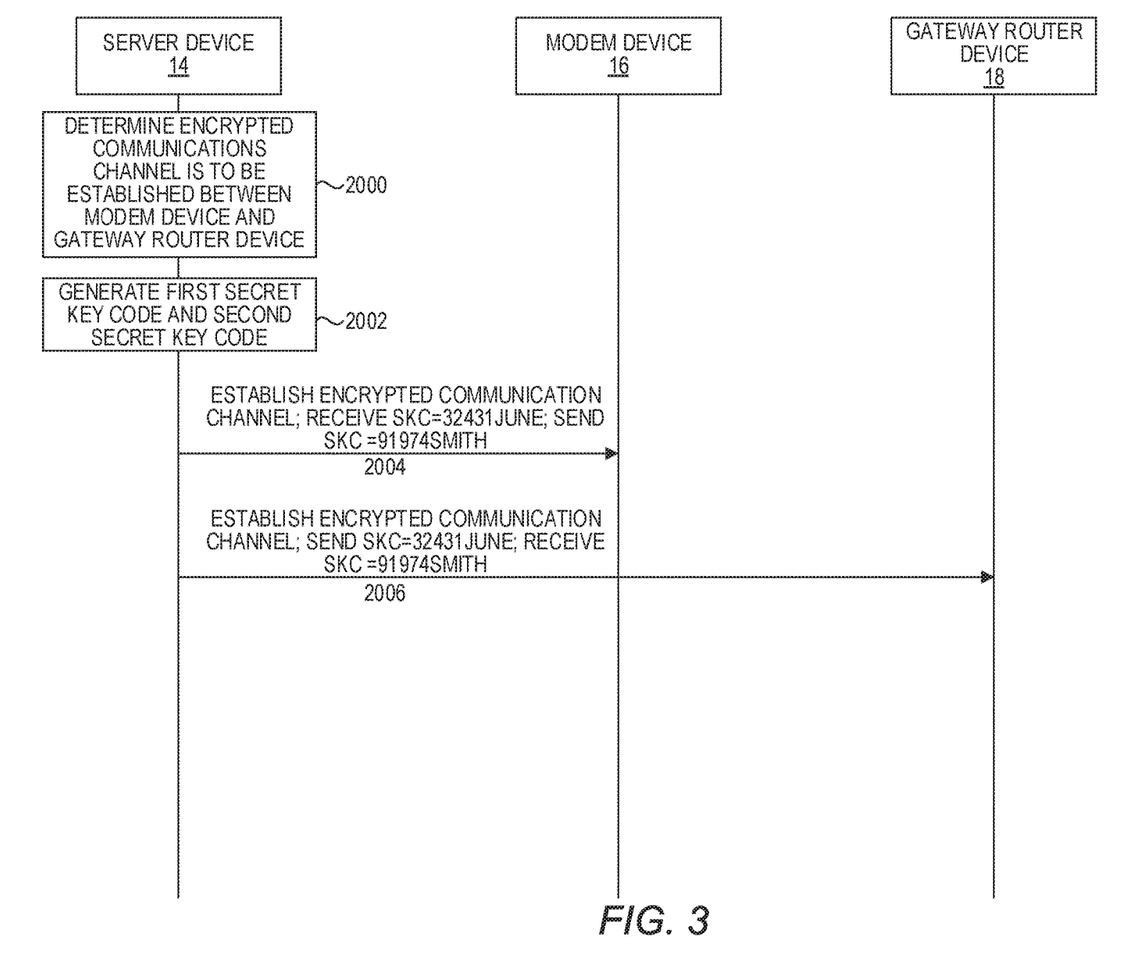
FIG. 3 is a message sequence diagram illustrating example messages communicated between and actions taken by several of the elements illustrated in FIG. 1 suitable for a modem device and a gateway router device to obtain a secret key code, according to one embodiment.

FIG. 3 is a message sequence diagram illustrating example messages communicated between and actions taken by various of the elements illustrated in FIG. 1. In this embodiment, the server device 14 determines that the encrypted communications channel 50 (FIG. 1) is to be established between the modem device 16 and the gateway router device 18 (FIG. 3, block 2000). This determination may be made in any number of ways. In one embodiment, the user 56 may access the customer accessible service generator 58, via a web browser or the like, and request that the encrypted communications channel 50 be established between the modem device 16 and the gateway router device 18 over the communications link 32. This may, in some embodiments, be a service offered by the service provider 24 upon demand, and may include, for example, a one-time or monthly service fee. The request generated by the customer accessible service generator 58 may identify the modem device 16, the gateway router device 18, and the subscriber profile 44 that corresponds to the establishment 26.

In another embodiment, as part of the initial installation, or after the initial installation, the technician 36 may access the service installation tool 38 to indicate that the encrypted communications channel 50 is to be established between the modem device 16 and the gateway router device 18.

In this embodiment, the server device 14 generates two secret key codes for use in establishing two encrypted communications channels between the gateway router device 18 and the modem device 16 (FIG. 3, block 2002). The secret key codes may be generated in any desired manner, such as randomly, or based on a predetermined algorithm. In some embodiments, the secret key codes may be based on information associated with the establishment 26 and maintained in the subscriber profile 44 that corresponds to the establishment 26. For example, one secret key code may comprise a combination of the zip code of the establishment 26 and the current month, and another secret key code may comprise the numeric street address of the establishment 26 and the last name of the individual's name on the account that corresponds to the establishment 26.

The server device 14 sends an instruction to attempt to establish an encrypted communications channel with the gateway router device 18 using the two secret key codes to the modem device 16 (FIG. 3, block 2004). The instructions may designate a first secret key code to be utilized for an encrypted receive communications channel and a second secret key code to be utilized for an encrypted transmit communications channel.

The server device 14 also sends an instruction to attempt to establish an encrypted communications channel with the modem device 16 using the two secret key codes to the gateway router device 18 via the modem device 16 (FIG. 3, block 2006). The instructions may designate the first secret key code to be utilized for an encrypted receive communications channel and the second secret key code to be utilized for an encrypted transmit communications channel.

Figure 4:
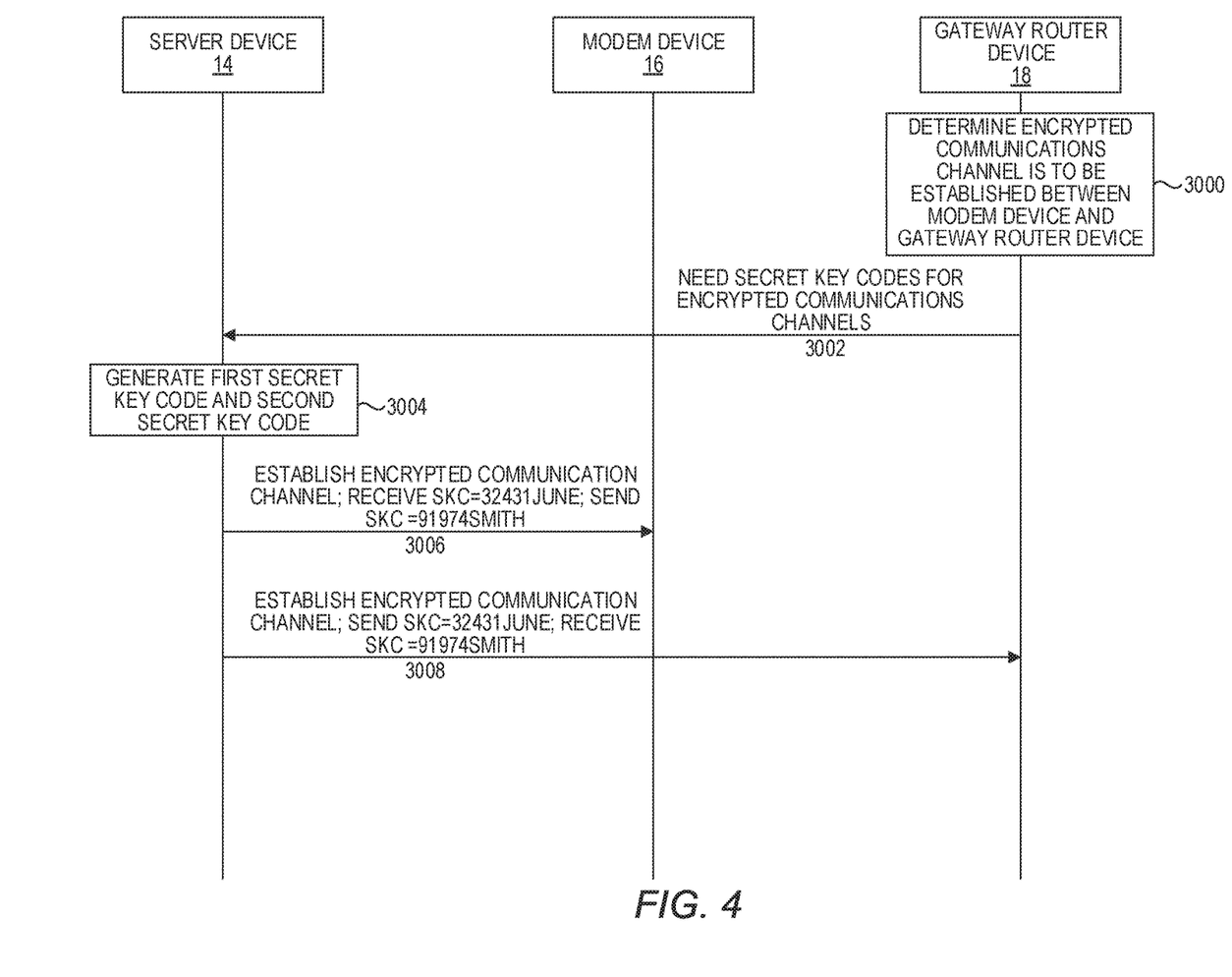
FIG. 4 is a message sequence diagram illustrating example messages communicated between and actions taken by various of the elements illustrated in FIG. 1 suitable for a modem device and a gateway router device to obtain a secret key code, according to a different embodiment than that illustrated in FIG. 3.

FIG. 4 is a message sequence diagram illustrating example messages communicated between and actions taken by various of the elements illustrated in FIG. 1, according to a different embodiment than that illustrated in FIG. 3. In this embodiment, the gateway router device 18 determines that the encrypted communications channel 50 (FIG. 1) is to be established between the modem device 16 and the gateway router device 18 (FIG. 4, block 3000). This determination may be made in any number of ways. In one embodiment, the gateway router device 18 may offer a user interface that allows the user 56, or the technician 36, to indicate a desire to establish the encrypted communications channel 50. In response, the gateway router device 18 sends a request to the server device 14 for a secret key code (FIG. 4, block 3002). The server device 14 receives the request and generates two secret key codes for use in establishing two encrypted communications channels between the gateway router device 18 and the modem device 16, substantially as described above with regard to FIG. 3 (FIG. 4, block 3004). The server device 14 sends instructions and key codes to the modem device 16 and the gateway router device 18 as discussed above with regard to FIG. 3 (FIG. 4, blocks 3006, 3008).

Figure 5:
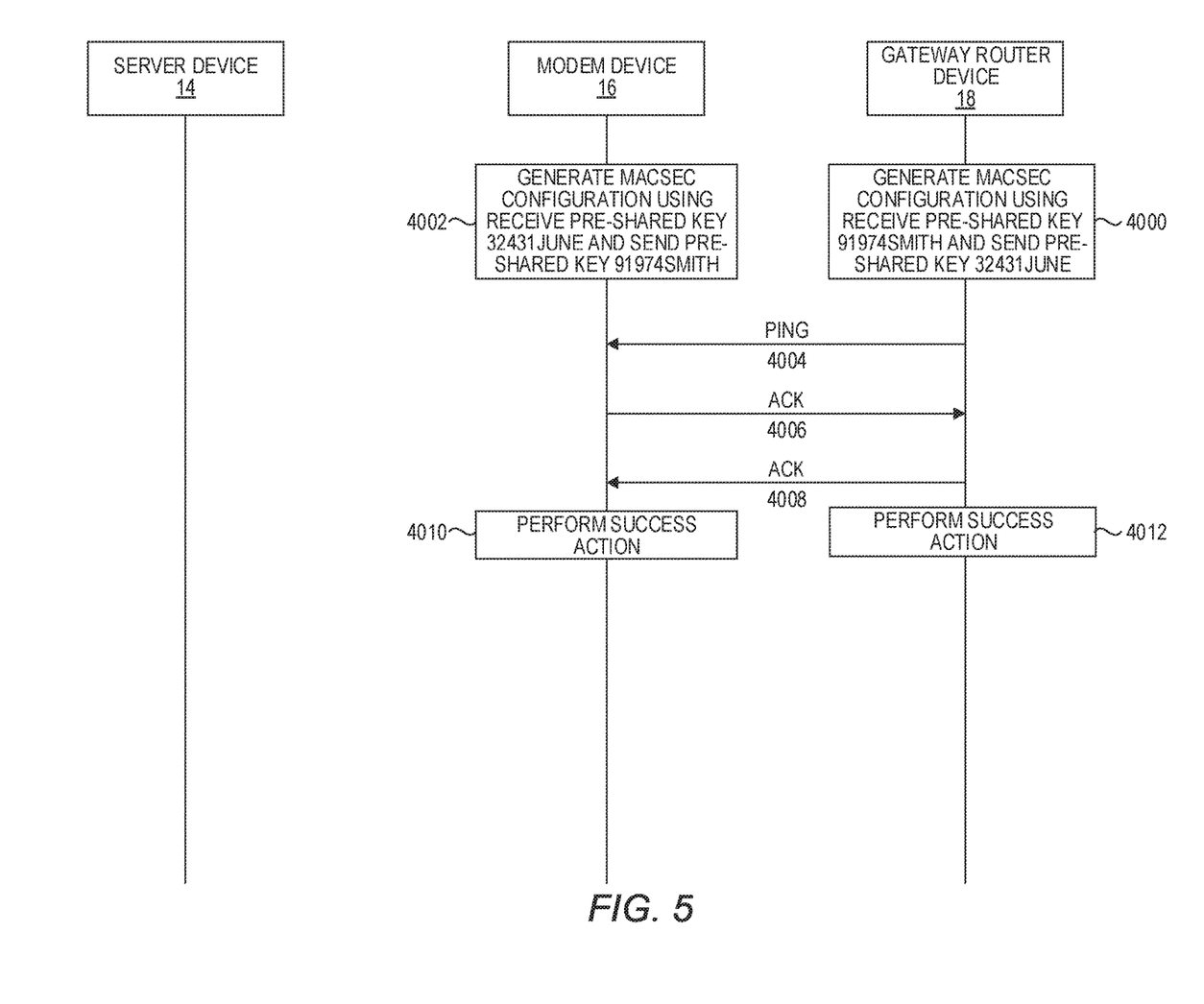
FIG. 5 is a message sequence diagram illustrating example messages communicated between and actions taken by various of the elements illustrated in FIG. 1, after a modem device and a gateway router device illustrated in FIGS. 3 and 4 have obtained secret key codes from the server device, according to one embodiment.

FIG. 5 is a message sequence diagram illustrating example messages communicated between and actions taken by various of the elements illustrated in FIG. 1, after the modem device 16 and the gateway router device 18 have obtained the secret key codes from the server device 14 as illustrated in FIGS. 3 and 4, according to one embodiment.

In some embodiments the gateway router device 18 and the modem device 16 may engage in a sequence of negotiations, including, for example, negotiations relating to which encryption protocol to utilize for encrypted communications. The gateway router device 18 generates the MACsec configuration 52 utilizing the two secret key codes as pre-shared encryption keys. Note that in this embodiment, the modem device 16 and the gateway router device 18 utilize the first and second secret key codes as pre-shared encryption keys. However, in other embodiments the modem device 16 and the gateway router device 18 each perform the same one or more predetermined mathematical and or string manipulations on the secret key codes to generate pre-shared encryption keys that are based on the secret key codes, respectively. Because both the modem device 16 and the gateway router device 18 each perform the same algorithm, the modem device 16 and the gateway router device 18 should independently generate the same pre-shared encryption keys, if given the same secret key codes.

The gateway router device 18 generates the MACsec configuration 52 such that data received from the modem device 16 will be decrypted using the "91974SMITH" pre-shared encryption key, and data transmitted by the gateway router device 18 to the modem device 16 will utilize the "32431JUNE" pre-shared encryption key to encrypt data (FIG. 5, block 4000). Similarly, the modem device 16 generates the MACsec configuration 54 utilizing the two secret key codes as pre-shared encryption keys. The modem device 16 generates the MACsec configuration 54 such that data received from the modem device 16 will be decrypted using the "32431JUNE" pre-shared encryption key, and data transmitted by the gateway router device 18 to the modem device 16 will utilize the "91974SMITH" pre-shared encryption key to encrypt data (FIG. 5, block 4002).

The gateway router device 18 then sends an encrypted communication to the modem device 16 based on the MACsec configuration 52 (FIG. 5, block 4004). In this example, the encrypted communication is a ping. The modem device 16 receives the encrypted communication, and the encrypted communication is successfully decrypted based on the MACsec configuration 54. The modem device 16 recognizes the communication as a ping, and in return sends an acknowledgement (ACK) to the gateway router device 18 that is encrypted based on the MACsec configuration 54 (FIG. 5, block 4006). The gateway router device 18 receives the encrypted communication, and the encrypted communication is successfully decrypted based on the MACsec configuration 52. The gateway router device 18 now determines that the attempt to establish the encrypted communications channel 50 (in this example, two encrypted communications channels 50) was successful. The gateway router device 18 sends an encrypted acknowledgement message to the modem device 16 to inform the modem device 16 that the gateway router device 18 was able to successfully decrypt the acknowledgement message (FIG. 5, block 4008). The modem device 16 receives the encrypted communication and the encrypted communication is successfully decrypted based on the MACsec configuration 54. The modem device 16 recognizes the communication as an acknowledgement message, and thus determines that the attempt to establish the encrypted communications channels 50 was successful.

The modem device 16 then performs a success action (FIG. 5, block 4010). The success action may comprise any number of different actions. In one embodiment, the success action may simply be to utilize the MACsec configuration 54 for all subsequent communications with the gateway router device 18. In some embodiments, the success action may include sending a message to the server device 14 indicating that the encrypted communications channels 50 were successfully established. Similarly, the gateway router device 18 also performs a success action (FIG. 5, block 4012). The success action may comprise any number of different actions. In one embodiment, the success action may simply be to utilize the MACsec configuration 52 for all subsequent communications with the modem device 16. In some embodiments, the success action may include sending a message to the server device 14 indicating that the encrypted communications channels 50 were successfully established. In some embodiments, the gateway router device 18 may present a message in a user interface indicating that the encrypted communications channels 50 were successfully established.

Figure 6:
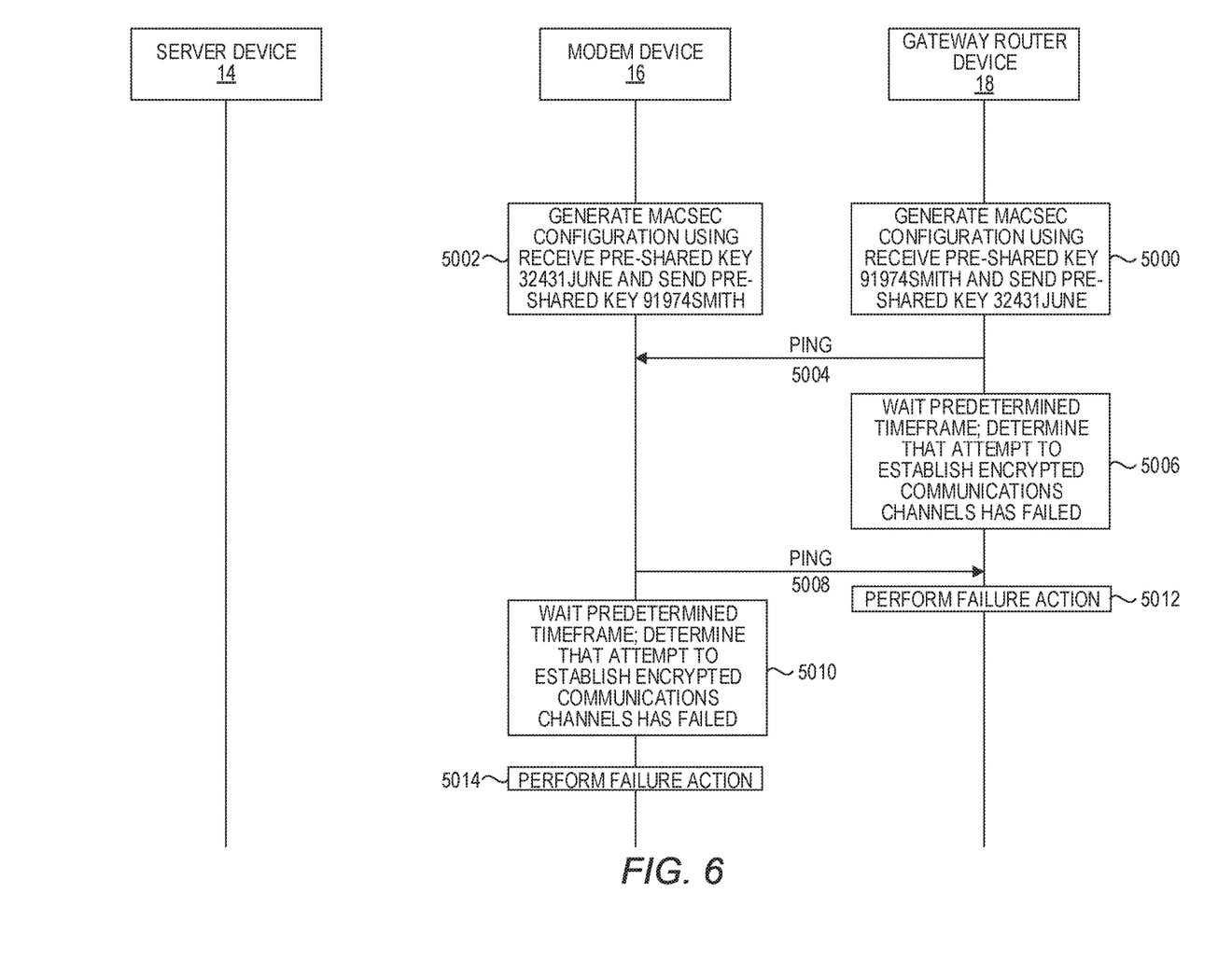
FIG. 6 is a message sequence diagram illustrating example messages communicated between and actions taken by various of the elements illustrated in FIG. 1, after the modem device and the gateway router device illustrated in FIGS. 3 and 4 have obtained secret key codes from the server device, according to another embodiment.

FIG. 6 is a message sequence diagram illustrating example messages communicated between and actions taken by various of the elements illustrated in FIG. 1, after the modem device 16 and the gateway router device 18 have obtained the secret key codes from the server device 14 as illustrated in FIGS. 3 and 4, according to another embodiment. In this embodiment, the actions associated with blocks 5000 and 5002 are identical to those associated with blocks 4000 and 4002, respectively, of FIG. 5. The gateway router device 18 then sends an encrypted communication to the modem device 16 based on the MACsec configuration 52 to determine if the encrypted communications channels 50 have been successfully established (FIG. 6, block 5004). In this example, assume that the encrypted communications channels 50 have not been successfully established. This may happen for any number of reasons, including, by way of non-limiting example, inconsistencies or incompatibilities in various software or hardware associated with the modem device 16 and the gateway router device 18, corruption in the messages carrying the secret key codes to the modem device 16 and the gateway router device 18, an inability for either of the modem device 16 and the gateway router device 18 to operate using the desired pre-shared encryption key mechanism, such as MACsec, or IPsec, or due to any number of other reasons.

The modem device 16 receives the encrypted communication, and cannot successfully decrypt the encrypted communication to determine that a ping has been sent to the modem device 16. The modem device 16 thus does not send an acknowledgement in response to the ping. The gateway router device 18 may wait for a predetermined period of time for an acknowledgement from the modem device 16, such as one second, two seconds, or the like. In the absence of receiving a communication from the modem device 16 within the predetermined period of time, the gateway router device 18 may determine that the attempt to establish the encrypted communications channel 50 has failed (FIG. 6, block 5006).

The modem device 16 may also mirror the actions of the gateway router device 18. The modem device 16 sends an encrypted communication to the gateway router device 18 based on the MACsec configuration 54 to determine if the encrypted communications channels 50 have been successfully established (FIG. 6, block 5008). The modem device 16 waits for a predetermined period of time for an acknowledgement from the gateway router device 18. In the absence of receiving a communication from the gateway router device 18 within the predetermined period of time, the modem device 16 determines that the attempt to establish the encrypted communications channel 50 has failed (FIG. 6, block 5010). The gateway router device 18 and the modem device 16 each perform a failure action (FIG. 6, blocks 5012, 5014).

The failure action may comprise any number of different actions. In one embodiment, the modem device 16 and the gateway router device 18 may remove the MACsec configurations 54, 52, respectively, and utilize an unencrypted channel to communicate. In other embodiments, the modem device 16 and the gateway router device 18 may inhibit any subsequent communications over the communications link 32, thereby preventing the computing devices 28 from communicating with any computing devices that are not on the LAN 30. The modem device 16 may, in some embodiments, send an alert or other message to the server device 14 indicating that the attempt to establish the encrypted communications channel was unsuccessful. In some embodiments, the gateway router device 18 may present a message in a user interface indicating that the encrypted communications channels were not successfully established.

In some embodiments, the gateway router device 18 and the modem device 16 may receive, from the server device 14, the appropriate failure action to take if the encrypted communications channels are not successfully established. For example, the server device 14 may send the failure action to take along with the instructions to attempt to establish the encrypted communications channels 50. By way of non-limiting example, the failure action may identify the action to take as inhibiting subsequent communications between the gateway router device 18 and the modem device 16, or may identify the action to take as subsequently using an unencrypted communications channel to communicate with the modem.

Figure 7:
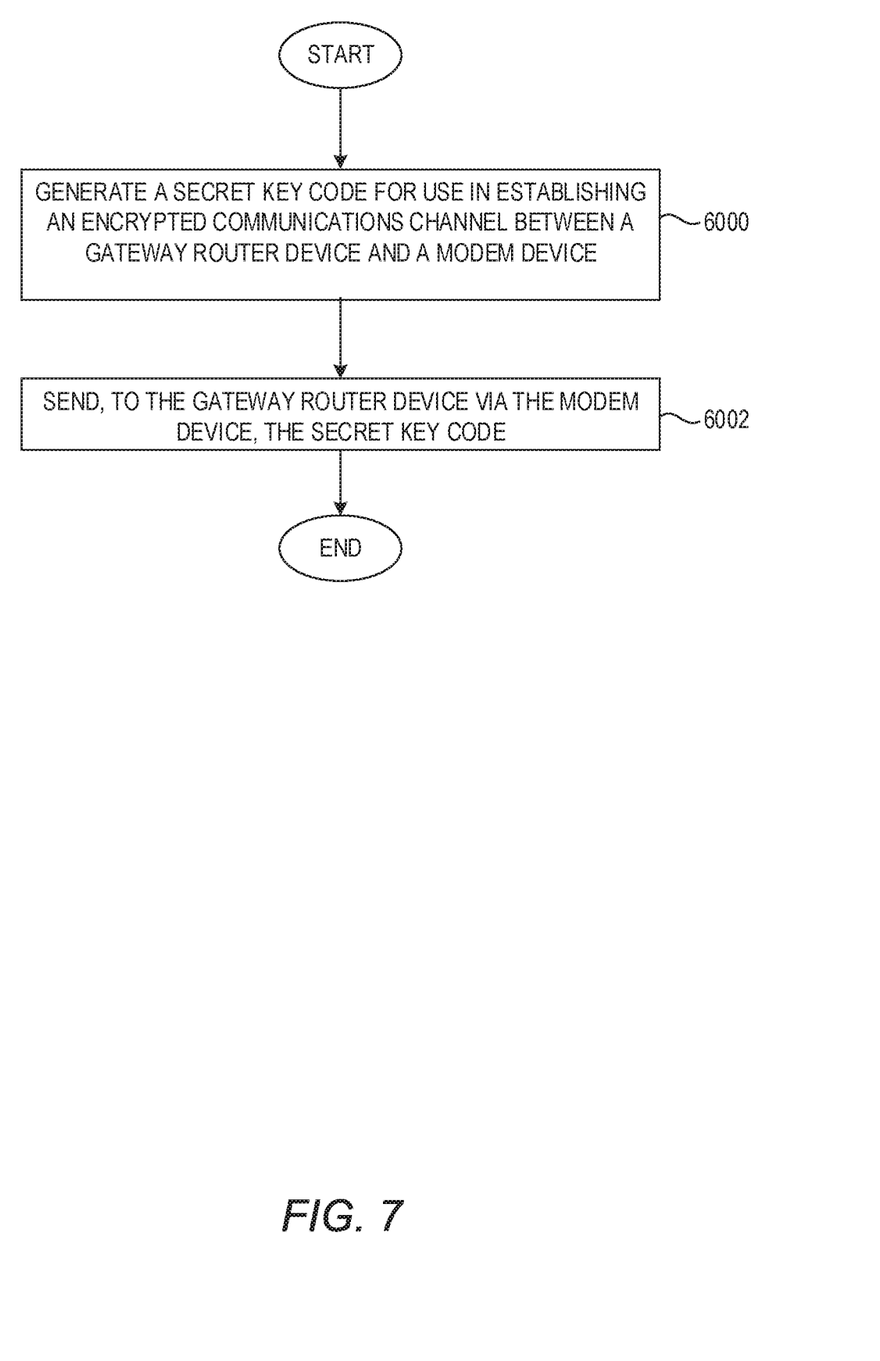
FIG. 7 is a flowchart of a method of establishing an encrypted communications channel without prior knowledge of the encryption key from the perspective of a server device, according to one embodiment.

FIG. 7 is a flowchart of a method of establishing an encrypted communications channel without prior knowledge of the encryption key from the perspective of the server device 14 according to one embodiment. The server device 14 generates at least one secret key code for use in establishing the encrypted communications channel 50 between the gateway router device 18 and the modem device 16 (FIG. 7, block 6000). The server device 14 sends, to the gateway router device 18 via the modem device 16, the secret key code (FIG. 7, block 6002).

Figure 8:
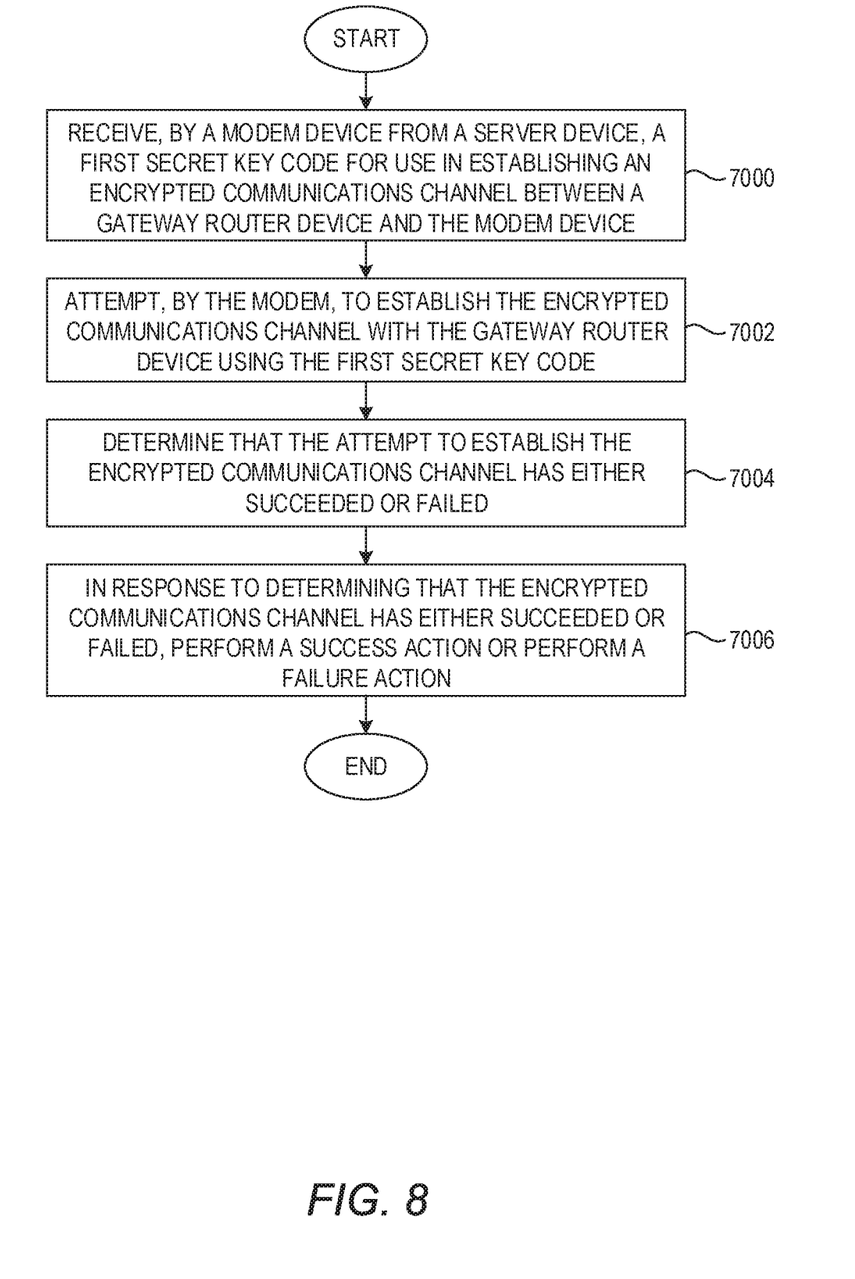
FIG. 8 is a flowchart of a method of establishing an encrypted communications channel without prior knowledge of the encryption key from the perspective of a modem device, according to one embodiment.

FIG. 8 is a flowchart of a method of establishing an encrypted communications channel without prior knowledge of the encryption key from the perspective of the modem device 16 according to one embodiment. The modem device 16 receives, from the server device 14, a secret key code for use in establishing an encrypted communications channel between the gateway router device 18 and the modem device 16 (FIG. 8, block 7000). The modem device 16 attempts to establish the encrypted communications channel with the gateway router device 18 using the first secret key code (FIG. 8, block 7002). The modem device 16 determines that the attempt to establish the encrypted communications channel has either succeeded or failed (FIG. 8, block 7004). The modem device 16, in response to determining that the encrypted communications channel has either succeeded or failed, performs a success action or performing a failure action (FIG. 8, block 7006).

Figure 9:
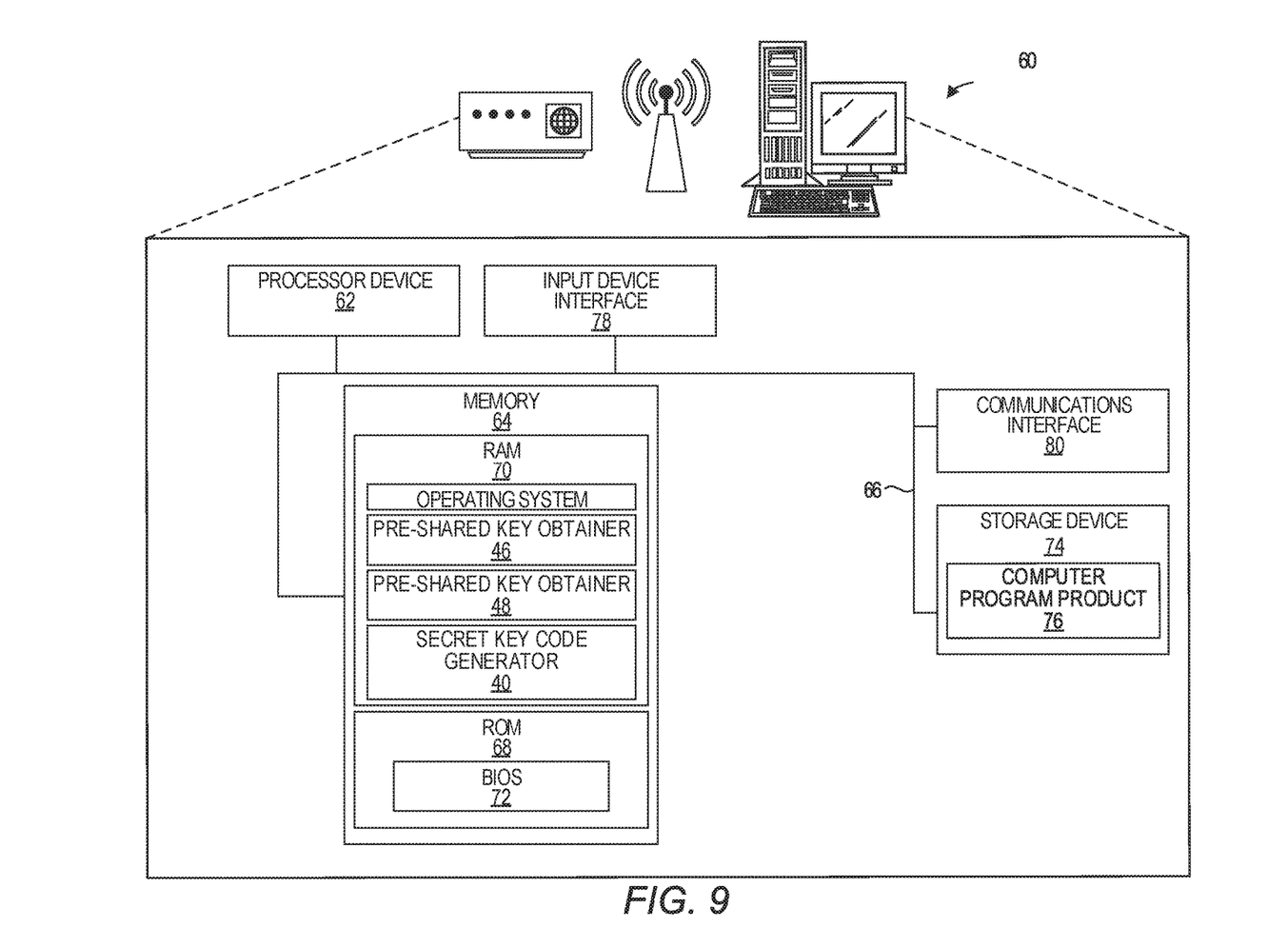
FIG. 9 is a block diagram of a computing device suitable for implementing any of the server device, the modem device, or the gateway router device illustrated in FIG. 1.

FIG. 9 is a block diagram of a computing device 60 suitable for implementing any of the server device 14, the modem device 16 or the gateway router device 18. The computing device 60, when implementing the server device 14 may comprise, for example, computer server, a desktop computing device, or the like. The computing device 60, when implementing the modem device 16 may comprise, for example, a cable modem device, a fiber modem device, or the like. The computing device 60, when implementing the gateway router device 18 may comprise, for example, a wired and/or wireless switch that is capable of communicating with a plurality of computing devices 28, and that is configured to provide gateway services to allow such computing devices 28 to communicate with computing devices that are not on the LAN 30. The computing device 60 includes a processor device 62, a system memory 64, and a system bus 66. The system bus 66 provides an interface for system components including, but not limited to, the system memory 64 and the processor device 62. The processor device 62 can be any commercially available or proprietary processor.

The system bus 66 may be any of several types of bus structures that may further interconnect to a memory bus (with or without a memory controller), a peripheral bus, and/or a local bus using any of a variety of commercially available bus architectures. The system memory 64 may include non-volatile memory 68 (e.g., read-only memory (ROM), erasable programmable read-only memory (EPROM), electrically erasable programmable read-only memory (EEPROM), etc.), and volatile memory 70 (e.g., random-access memory (RAM)). A basic input/output system (BIOS) 72 may be stored in the non-volatile memory 68 and can include the basic routines that help to transfer information between elements within the computing device 60. The volatile memory 70 may also include a high-speed RAM, such as static RAM, for caching data.

The computing device 60 may further include or be coupled to a non-transitory computer-readable storage medium such as a storage device 74, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 74 and other drives associated with computer-readable media and computer-usable media may provide non-volatile storage of data, data structures, computer-executable instructions, and the like.

A number of modules can be stored in the storage device 74 and in the volatile memory 70, including an operating system and one or more program modules, such as the pre-shared key obtainer 46, the pre-shared key obtainer 48, and/or the secret key code generator 40, which may implement the functionality described herein in whole or in part.

All or a portion of the examples may be implemented as a computer program product 76 stored on a transitory or non-transitory computer-usable or computer-readable storage medium, such as the storage device 74, which includes complex programming instructions, such as complex computer-readable program code, to cause the processor device 62 to carry out the steps described herein.

A user may also be able to enter one or more configuration commands through a keyboard, a pointing device such as a mouse (not illustrated), or a touch-sensitive surface such as a display device. Such input devices may be connected to the processor device 62 through an input device interface 78 that is coupled to the system bus 66 but can be connected by other interfaces such as a parallel port, an Institute of Electrical and Electronic Engineers (IEEE) 1394 serial port, a Universal Serial Bus (USB) port, an IR interface, and the like. The computing device 60 may also include one or more communications interfaces 80 suitable for communicating with other devices. The communications interfaces 80 may comprise, by way of non-limiting example, a fiber transceiver, a wireless transceiver, a coaxial transceiver, and/or an Ethernet transceiver.

Those skilled in the art will recognize improvements and modifications to the preferred embodiments of the disclosure. All such improvements and modifications are considered within the scope of the concepts disclosed herein and the claims that follow.

What is claimed is:

1. A method comprising:

receiving, by a gateway router device from a server device via an intermediate modem device, a first secret key code for use in establishing an encrypted MACsec communications channel between the gateway router device and the modem device, wherein the modem device receives a second secret key code from the server device that is associated with the first secret key code;

making, by the gateway router device, an attempt to establish the encrypted MACsec communications channel with the modem device using a pre-shared key that is based on the first secret key code, wherein making the attempt to establish the encrypted communications channel comprises exchanging, by the gateway router device, an encrypted communication with a second encrypted communication from the modem device, wherein the encrypted communication is based on a first MACsec configuration generated using the pre-shared key, and wherein the second encrypted communication is based on a second MACsec configuration generated by the modem device using a second pre-shared key based on the second secret key code;

determining that the attempt to establish the encrypted MACsec communications channel has either succeeded or failed; and in response to determining that the attempt to establish the encrypted MACsec communications channel has either succeeded or failed, performing a success action or performing a failure action.

2. The method of claim 1 further comprising:

receiving, from the server device, a second secret key code for use in establishing the encrypted MACsec communications channel between the gateway router device and the modem device; and wherein making, by the gateway router device, the attempt to establish the encrypted MACsec communications channel with the modem device using the pre-shared key that is based on the first secret key code further comprises:
attempting, by the gateway router device, to establish the MACsec encrypted communications channel with the modem device using the first secret key code for sending packets on the MACsec encrypted communications channel; and
attempting, by the gateway router device, to establish the MACsec encrypted communications channel with the modem device using the second secret key code for receiving packets on the MACsec encrypted communications channel.

3. The method of claim 1 further comprising:
prior to receiving, by the gateway router device from the server device, the first secret key code, determining, by the gateway router device, that the MACsec encrypted communications channel between the gateway router device and the modem device is to be established; and
in response to determining, by the gateway router device, that the MACsec encrypted communications channel between the gateway router device and the modem device is to be established, sending a request to the server device for the first secret key code.

4. The method of claim 1 wherein making, by the gateway router device, the attempt to establish the MACsec encrypted communications channel with the modem device using the pre-shared key that is based on the first secret key code comprises:
using the first secret key code as a pre-shared key in a sequence of negotiations with the modem device to establish the MACsec encrypted communications channel with the modem device.

5. The method of claim 1 wherein making, by the gateway router device, the attempt to establish the MACsec encrypted communications channel with the modem device using the pre-shared key that is based on the first secret key code comprises:
implementing an algorithm that uses the first secret key code to derive a pre-shared key; and
using the pre-shared key in a sequence of negotiations with the modem device to establish the MACsec encrypted communications channel with the modem device.

6. The method of claim 1 wherein the gateway router device and the modem device are directly communicatively coupled to one another via a single Ethernet cable with no intermediate devices, and the attempt to establish the MACsec encrypted communications channel is made over the Ethernet cable.

7. The method of claim 1 wherein the gateway router device comprises two internet protocol (IP) addresses, a first IP address associated with a local area network and a second IP address associated with a second network that is different from the local area network, and wherein the modem device is on the second network and not on the local area network.

8. The method of claim 7 wherein the gateway router device communicates with at least one computing device on the local area network, and enables communications between the at least one computing device and computing devices not on the local area network.

9. The method of claim 1 wherein the gateway router device determines that the attempt to establish the MACsec encrypted communications channel has succeeded, and wherein performing the success action comprises sending a message to the server device indicating that the MACsec encrypted communications channel was successfully established.

10. The method of claim 1 wherein the gateway router device determines that the attempt to establish the MACsec encrypted communications channel has failed, and wherein performing the failure action comprises subsequently using an unencrypted communications channel to communicate with the modem device.

11. The method of claim 1 wherein, prior to exchanging, by the gateway router device, the encrypted communication, the method comprises generating the first MACsec configuration to implement the MACsec encrypted communications channel with the modem device; and
wherein the gateway router device determines that the attempt to establish the MACsec encrypted communications channel has failed, and wherein performing the failure action comprises removing the first MACsec configuration such that subsequent communications with the modem device are unencrypted.

12. The method of claim 11 wherein the gateway router device determines that the attempt to establish the MACsec encrypted communications channel has failed, and wherein performing the failure action comprises inhibiting subsequent communications between the gateway router device and the modem device.

13. The method of claim 1 further comprising:
receiving, by the gateway router device from the server device, the failure action that identifies an action to take if the attempt to establish the MACsec encrypted communications channel fails, wherein the action to take comprises one of inhibiting subsequent communications between the gateway router device and the modem device and subsequently using an unencrypted communications channel to communicate with the modem.

14. The method of claim 1 further comprising receiving, by the gateway router device from the server device, an instruction to attempt to establish the MACsec encrypted communications channel with the modem device using the pre-shared key that is based on the first secret key code.

15. The method of claim 1 wherein determining that the attempt to establish the MACsec encrypted communications channel has either succeeded or failed comprises:
sending, by the gateway router device to the modem device, an encrypted communication;
receiving, by the gateway router device from the modem device, an encrypted response; and
in response to receiving the encrypted response, determining that the attempt to establish the MACsec encrypted communications channel has succeeded.

16. The method of claim 1 wherein determining that the attempt to establish the encrypted communications channel has either succeeded or failed comprises:
sending, by the gateway router device to the modem device, an encrypted communication;
determining, by the gateway router device, that no response has been received from the modem device within a predetermined period of time; and
in response to determining that no response has been received from the modem device within the predetermined period of time, determining that the attempt to establish the MACsec encrypted communications channel has failed.

17. A gateway router device comprising:
a memory; and a processor device coupled to the memory, the processor device configured to:

receive, from a server device via an intermediate modem device, a first secret key code for use in establishing a MACsec encrypted communications channel between the gateway router device and the modem device, wherein the modem device receives a second secret key code from the server device that is associated with the first secret key code;

make an attempt to establish the MACsec encrypted communications channel with the modem device using a pre-shared key that is based on the first secret key code, wherein making the attempt to establish the encrypted communications channel comprises exchanging, by the gateway router device, an encrypted communication with a second encrypted communication from the modem device, wherein the encrypted communication is based on a first MACsec configuration generated using the pre-shared key, and wherein the second encrypted communication is based on a second MACsec configuration generated by the modem device using a second pre-shared key based on the second secret key code;

determine that the attempt to establish the MACsec encrypted communications channel has either succeeded or failed; and in response to determining that the attempt to establish the MACsec encrypted communications channel has either succeeded or failed, perform a success action or perform a failure action.

18. The gateway router device of claim 17 wherein to attempt to establish the MACsec encrypted communications channel with the modem device using the pre-shared key that is based on the first secret key code, the processor device is further configured to:

implement an algorithm that uses the first secret key code to derive a pre-shared key; and use the pre-shared key in a sequence of negotiations with the modem device to establish the MACsec encrypted communications channel with the modem device.

19. A non-transitory computer-readable storage medium that includes instructions configured to cause a processor device to:

receive, from a server device via an intermediate modem device, a first secret key code for use in establishing a MACsec encrypted communications channel between the gateway router device and the modem device, wherein the modem device receives a second secret key code from the server device that is associated with the first secret key code;

make an attempt to establish the encrypted MACsec communications channel with the modem device using a pre-shared key that is based on the first secret key code, wherein making the attempt to establish the encrypted communications channel comprises exchanging, by the gateway router device, an encrypted communication with a second encrypted communication from the modem device, wherein the encrypted communication is based on a first MACsec configuration generated using the pre-shared key, and wherein the second encrypted communication is based on a second MACsec configuration generated by the modem device using a second pre-shared key based on the second secret key code;

determine that the attempt to establish the encrypted MACsec communications channel has either succeeded or failed; and in response to determining that the attempt to establish the encrypted MACsec communications channel has either succeeded or failed, perform a success action or perform a failure action.

* * * * *